US012092276B2

(12) United States Patent
Dong et al.

(10) Patent No.: US 12,092,276 B2
(45) Date of Patent: Sep. 17, 2024

(54) LAMP HAVING DYNAMIC STARRY SKY EFFECT

(71) Applicant: Guangdong Baolun Electronics Co., Ltd., Guangdong (CN)

(72) Inventors: Chen Dong, Guangdong (CN); Changhua Zhang, Guangdong (CN); Zhenghui Zhu, Guangdong (CN); Dingjin Zhao, Guangdong (CN)

(73) Assignee: GUANGDONG BAOLUN ELECTRONICS CO., LTD., Guangzhou (CN)

( * ) Notice: Subject to any disclaimer, the term of this patent is extended or adjusted under 35 U.S.C. 154(b) by 0 days.

(21) Appl. No.: 18/417,865

(22) Filed: Jan. 19, 2024

(65) Prior Publication Data

US 2024/0159369 A1 May 16, 2024

Related U.S. Application Data

(63) Continuation of application No. PCT/CN2021/122618, filed on Oct. 8, 2021.

(30) Foreign Application Priority Data

Aug. 31, 2021 (CN) .......................... 202111018116.4

(51) Int. Cl.
*F21S 10/00* (2006.01)
*F21V 5/04* (2006.01)
(Continued)

(52) U.S. Cl.
CPC .............. *F21S 10/007* (2013.01); *F21V 5/04* (2013.01); *F21V 7/04* (2013.01); *F21V 14/006* (2013.01)

(58) Field of Classification Search
CPC .. F21S 10/007; F21V 5/04; F21V 7/04; F21V 14/006; F21W 2121/008
See application file for complete search history.

(56) References Cited

U.S. PATENT DOCUMENTS 11,221,117 B1 * 1/2022 Xu ............................ F21V 5/04
11,500,277 B2 * 11/2022 Zheng ................ G03B 21/2066

FOREIGN PATENT DOCUMENTS

CN 206093600 U 4/2017
CN 207262094 U 4/2018
(Continued)

*Primary Examiner* — Matthew J. Peerce
(74) *Attorney, Agent, or Firm* — MUNCY GEISSLER OLDS & LOWE P.C.

(57) ABSTRACT

Disclosed is a lamp having a dynamic starry sky effect. The lamp includes a lamp frame, and a first light source, optical integrating lenses, a roller beam splitter, a starry sky laser assembly and a starry sky mirror disc, where the optical integrating lenses are configured to focus light emitted by the first light source into strip-shaped light spots and transmit the strip-shaped light spots formed through focusing to the roller beam splitter at a front part in a shining direction; the roller beam splitter is configured to form the light into nonlinear dynamic strip-shaped light spots during rotation; the starry sky laser assembly includes a second light source; the starry sky mirror disc is configured to reflect light generated by the second light source; and the light dots and the strip-shaped light spots are superposed and combined together to form the dynamic starry sky effect.

10 Claims, 2 Drawing Sheets

(51) Int. Cl.
*F21V 7/04* (2006.01)
*F21V 14/00* (2018.01)

(56) References Cited

FOREIGN PATENT DOCUMENTS

| | | | | |
|---|---|---|---|---|
| CN | 210891354 U | * | 6/2020 |
| CN | 212537728 U | | 2/2021 |
| CN | 112728465 A | | 4/2021 |
| CN | 213177842 U | | 5/2021 |
| CN | 213333846 U | | 6/2021 |
| CN | 213930756 U | | 8/2021 |
| CN | 214064790 U | | 8/2021 |

* cited by examiner

LAMP HAVING DYNAMIC STARRY SKY EFFECT

CROSS REFERENCE TO RELATED APPLICATIONS

This application is a Continuation of the U.S. National Stage of International Application No. PCT/CN2021/122618 filed on Oct. 8, 2021, which claims priority to Chinese Patent Application No. 202111018116.4 on filed Aug. 31, 2021 under 35 U.S.C. § 119; the entire contents of all of which are hereby incorporated by reference.

TECHNICAL FIELD

The present application relates to the technical field of effect display lamps, and particularly relates to a lamp having a dynamic starry sky effect.

BACKGROUND

A lamp for displaying a starry sky effect can be taken as an atmosphere lamp in a house, an automobile, a scenic area, an entertainment venue or other places. The inventor of the present application found out that an existing starry sky projection lamp generally only has a dot-shaped starry sky effect, but does not have a strip-shaped cloud effect. Thus, a combined effect of a nebula is unavailable, which is not ideal. Moreover, the displayed starry sky effect is generally static. Thus, a user cannot feel a strong sense of experience, which is required to be improved. Therefore, a lamp capable of dynamically displaying a starry sky effect of a nebula is required.

SUMMARY

In order to solve defects in the prior art, an objective of the present application is to provide a lamp having a dynamic starry sky effect, which can solve the problem of dynamically displaying a starry sky.

A technical solution for realizing an objective of the present application is as follows: a lamp having a dynamic starry sky effect includes a lamp frame, and a first light source, an optical integrating lens, a roller beam splitter, a starry sky laser assembly and a starry sky mirror disc that are mounted in the lamp frame. The optical integrating lenses are mounted at a front part in a shining direction of the first light source, and the optical integrating lens is configured to focus light emitted by the first light source into strip-shaped light spots and transmit the strip-shaped light spots formed through focusing to the roller beam splitter located at the front part in the shining direction. The roller beam splitter is configured to form the light into nonlinear dynamic strip-shaped light spots during rotation.

The starry sky laser assembly includes a second light source. The second light source is configured to generate light, the light generated by the second light source is emitted in a direction of the starry sky mirror disc, and the light is reflected by the starry sky mirror disc to form a plurality of light dots spaced apart from each other.

The light dots are reflected into the strip-shaped light spots, such that the light dots and the strip-shaped light spots are simultaneously observed by a human eye at a specific position. The light dots and the strip-shaped light spots do not coincide but are superposed and combined together, such that the dynamic starry sky effect is formed by simulating stars with the light dots and simulating a nebula with the strip-shaped light spots.

Further, the first light source is mounted on a bottom wall of the lamp frame, the optical integrating lens is mounted right above the first light source, and upward light emitted by the first light source is shined on the optical integrating lens. The first light source includes a plurality of light source units, each of the light source units corresponds to one optical integrating lens, and the plurality of the light source units are arranged in a straight line in an axial direction of the lamp frame.

Further, the first light source is located at one side inside the lamp frame, and the starry sky laser assembly is located at the other side inside the lamp frame, such that the first light source and the starry sky laser assembly are spaced apart from each other by a certain distance. After the strip-shaped light spots finally formed by the light emitted by the first light source and the light dots formed by the light emitted by the starry sky laser assembly pass a certain incident light path, a starry sky effect of a nebula formed by combining the light dots and the strip-shaped light spots is finally formed in a specific area. The starry sky effect of the nebula is observed by a human eye in the area.

Further, two ends of the roller beam splitter are rotatably connected to a first supporting frame and a second supporting frame respectively, such that the roller beam splitter rotates relative to the first supporting frame and the second supporting frame. The first supporting frame and the second supporting frame are fixedly mounted spaced apart from each other on an inner bottom wall of the lamp frame.

Further, a supporting plate is fixedly mounted on the first supporting frame, a control panel and a light source drive plate are mounted on the supporting plate, and the control panel is electrically connected to the light source drive plate. The control panel is configured to be operated by a human hand to control, by means of the light source drive plate, the first light source to be turned on or turned off. One end of the control panel extends out of a surface of a transparent panel, such that the control panel is directly operated and controlled by the human hand.

Further, the roller beam splitter is in transmission connection to a driving device by means of a transmission shaft on the roller beam splitter, the driving device is configured to drive the roller beam splitter to rotate, the transmission shaft is fixedly mounted at one end of the roller beam splitter close to the second supporting frame, and the driving device is fixedly mounted on the second supporting frame.

Further, the starry sky mirror disc and the starry sky laser assembly are both mounted on the second supporting frame, a starry sky drive plate is further mounted on the second supporting frame, and the starry sky laser assembly is electrically connected to the starry sky drive plate. The starry sky drive plate is configured to control the second light source in the starry sky laser assembly to be turned on or turned off, such that a light source of the starry sky laser assembly is turned on or turned off.

Further, the transparent panel is mounted at one side end of the lamp frame, a first opening and a second opening that are spaced apart from each other are dug on the transparent panel, the roller beam splitter is located right below the second opening, and the starry sky mirror disc is located right below the first opening.

The starry sky laser assembly further includes a lens cone and color sheets, the second light source, the lens cone and the color sheets are sequentially arranged on the second supporting frame in a direction away from the roller beam splitter, and the light generated by the second light source is emitted in a direction of the lens cone. The lens cone is configured to split the light, such that non-coincident light is formed. The color sheets are configured to color the light, such that light of different colors is formed. The light of different colors passes through an optical imaging lens assembly and then is emitted to the starry sky mirror disc, the optical imaging mirror assembly is mounted between the starry sky mirror disc and the starry sky laser assembly, and the starry sky mirror disc reflects the light out through the first opening, such that light dots are formed. Different light forms light spots at different positions.

The light reflected by the starry sky mirror disc through the first opening is directed to light reflected through the second opening.

Further, the lens cone includes a plurality of strip-shaped lenses, and all the strip-shaped lenses are spliced into the lens cone. One end of the lens cone close to the second light source is a narrow end, and one end away from the second light source is a wide end. The light emitted by the second light source is subjected to actions of all the lenses to form a plurality of pieces of non-coincident light.

The starry sky mirror disc includes a plurality of small lenses, and all the small lenses are spliced spaced apart from each other to form the starry sky mirror disc. After a plurality of pieces of light colored by the color sheets are emitted to the small lenses, the starry sky mirror disc reflects a plurality of light dots. The light dots form light-dot light spots to simulate stars.

Further, the roller beam splitter includes a hollow regular pentagonal prism formed by sequentially splicing 5 flat strip-shaped lenses.

Beneficial effects of the present application are as follows, a starry sky is simulated by light-dot light spots formed by the light dots, an auroral cloud in the night sky is simulated by the strip-shaped light spots, and the light-dot light spots and the strip-shaped light spots are superposed together to form a combined effect, such that a starry sky effect of a galactic nebula is formed. Moreover, a dynamic effect is presented, an extremely beautiful effect is achieved, and a user experience degree is improved.

In the FIGURES, 1—waterproof cover, 2—starry sky mirror disc, 3—first opening, 4—transparent panel, 5—second opening, 6—roller beam splitter, 7—stand, 8—fixed plate, 9—lamp frame, 10—starry sky drive plate, 11—control panel, 12—light source drive plate, 13—supporting plate, 14—first supporting frame, 15—first light source, 16—optical integrating lens, 17—driving device, 18—starry sky laser assembly, 181—second light source, 182—lens cone, 183—color sheet, 19—optical imaging lens assembly, and 20—second supporting frame.

DETAILED DESCRIPTION OF THE EMBODIMENTS

The present application will be further described below in combination with the accompanying drawings and particular implementations.

Figure 1:
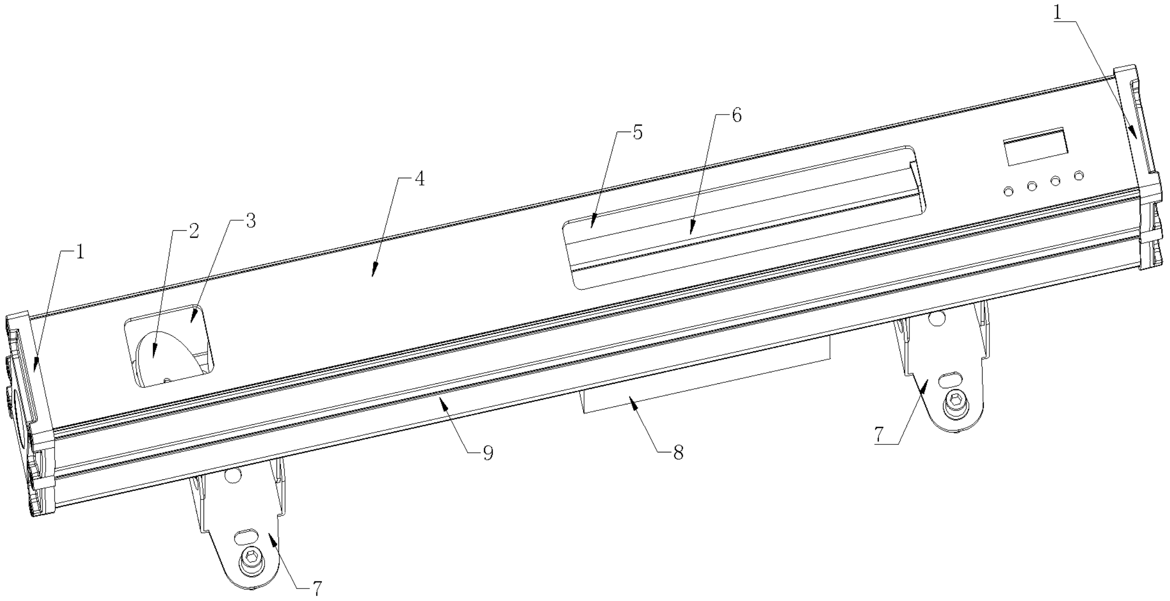
FIG. 1 is a schematic structural diagram of the present application.
Figure 2:
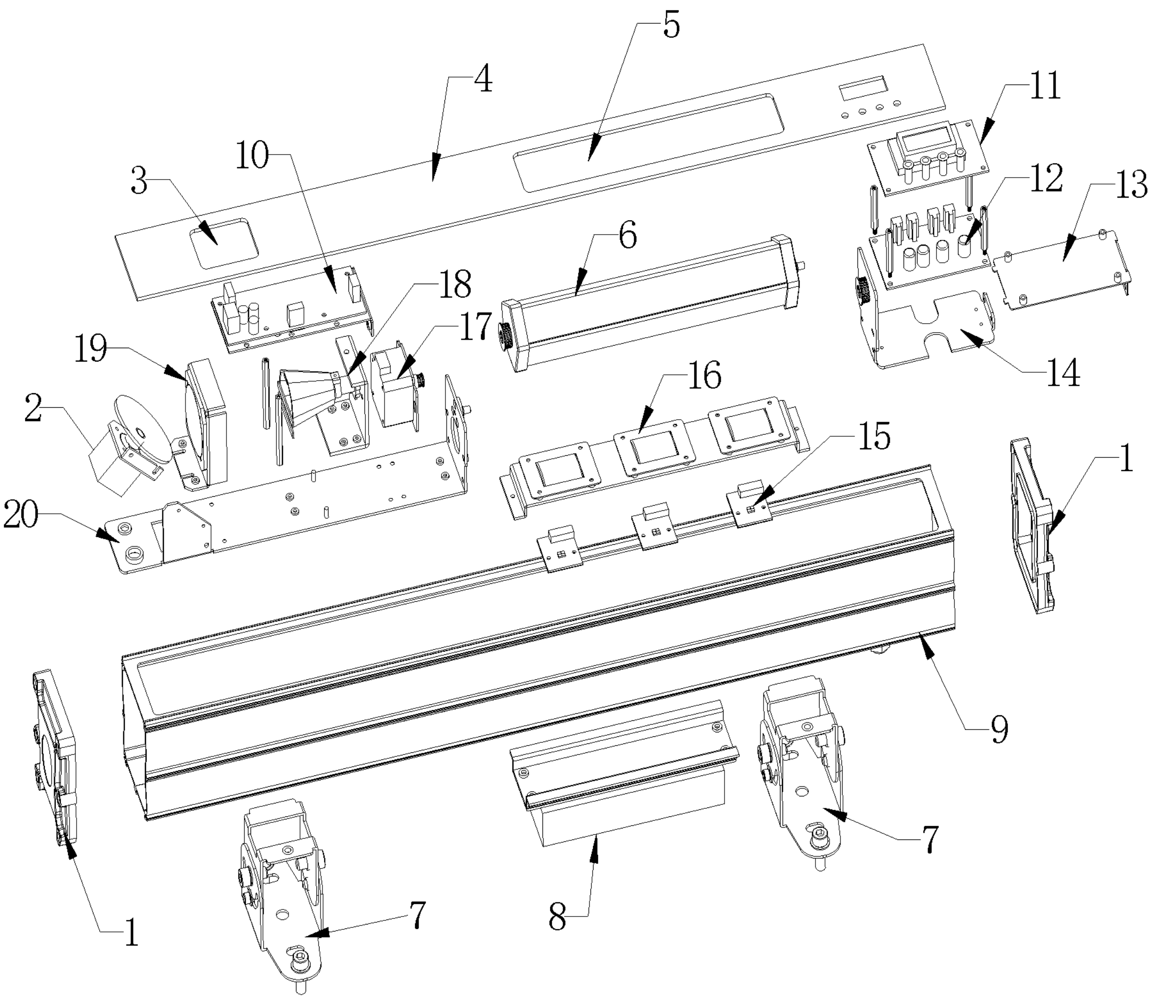
FIG. 2 is a schematic exploded view of the present application.
Figure 3:
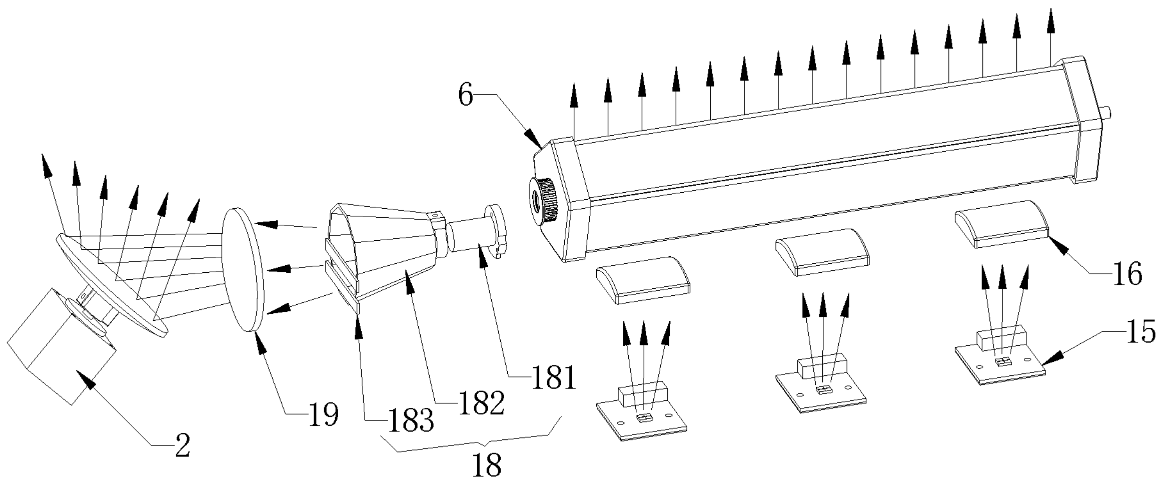
FIG. 3 is a schematic diagram showing that light emitted by a light source flows through all relevant components according to the present application, where arrows in the figure represent shining directions of the light.

As shown in FIGS. 1-3, a lamp having a dynamic starry sky effect includes a lamp frame 9, and a first light source 15, optical integrating lenses 16, a roller beam splitter 6, a starry sky laser assembly 18, an optical imaging lens assembly 19 and a starry sky mirror disc 2 that are mounted in the lamp frame 9. The optical integrating lenses 16 are all mounted at a front part in a shining direction of the first light source 15. The optical integrating lenses 16 are configured to focus light emitted by the first light source 15 into strip-shaped light spots and transmit the strip-shaped light spots formed through focusing to the roller beam splitter 6 located at the front part in the shining direction. The roller beam splitter 6 is configured to form the light into nonlinear dynamic strip-shaped light spots having uniform brightness during rotation, such that an auroral cloud effect of a natural night sky is simulated. The optical integrating lenses 16 are optical integrators. The lamp frame 9 is a hollow rectangular prism.

The starry sky laser assembly 18 is configured to generate light that passes through the optical imaging lens assembly 19 and then is emitted in a direction of the starry sky mirror disc 2. The optical imaging lens assembly 19 is configured to gather all the light emitted by the starry sky laser assembly 18 and shine the light on the starry sky mirror disc 2. The light is reflected by the starry sky mirror disc 2 to form a plurality of light dots spaced apart from each other, and the light dots are reflected into the strip-shaped light spots to simulate the starry sky effect of the natural night sky. Each dot represents a star. The case that the light dots are reflected into the strip-shaped light spots means that the light emitted by the starry sky laser assembly 18 and the light emitted by the first light source 15 pass through a certain incident light path to intersect, such that the light dots and the strip-shaped light spots are simultaneously observed by a human eye at a specific position. Moreover, the light dots and the strip-shaped light spots do not coincide but are superposed and combined together, such that a starry sky is formed by simulating stars with the light dots and simulating a nebula effect of an auroral cloud with the strip-shaped light spots.

In an alternative embodiment, the first light source 15 is mounted on a bottom wall of the lamp frame 9, the optical integrating lenses 16 are mounted right above the first light source 15, and upward light emitted by the first light source 15 is shined on the optical integrating lenses 16. The first light source 15 includes a plurality of light source units. Each of the light source units corresponds to one optical integrating lens 16, and the plurality of light source units are arranged in a straight line in an axial direction of the lamp frame 9.

The first light source 15 is located at one side inside the lamp frame 9, and the starry sky laser assembly 18 is located at the other side inside the lamp frame 9, such that the first light source 15 and the starry sky laser assembly 18 are spaced apart from each other by a certain distance. After the strip-shaped light spots finally formed by the light emitted by the first light source 15 and the light dots formed by the light emitted by the starry sky laser assembly 18 pass a certain incident light path, a starry sky effect of a nebula formed by combining the light dots and the strip-shaped light spots is finally formed in a specific area. The starry sky effect of the nebula is observed by a human eye in the area. The reason why it is required to combine the light dots with the strip-shaped light spots is that visibility of the human eye is within a certain range. If a distance between the light dot and the strip-shaped light spots is great, a visual effect of not being in the same night sky is likely to occur. Alternatively, if the distance is small, the light dots and the strip-shaped light spots are likely to coincide together and coverage of a starry sky is too small.

The transparent panel 4 is mounted at one side end of the lamp frame 9, a first opening 3 and a second opening 5 that are spaced apart from each other are dug on the transparent panel 4, and the roller beam splitter 6 is located right below the second opening 5. Thus, the strip-shaped light spots formed by the roller beam splitter 6 can just pass through the second opening 5, and a viewer can observe an auroral cloud effect of the strip-shaped light spots through the second opening 5. Two ends of the roller beam splitter 6 are rotatably connected to a first supporting frame 14 and a second supporting frame 20 respectively such that the roller beam splitter 6 can rotate relative to the first supporting frame 14 and the second supporting frame 20, and the roller beam splitter 6 can rotate inside the lamp frame 9. When the roller beam splitter 6 rotates, the light emitted by the optical integrating lenses 16 located below passes through the roller beam splitter 6 to present nonlinear dynamic strip-shaped light spots.

The first supporting frame 14 is fixedly mounted on an inner bottom wall of the lamp frame 9. A supporting plate 13 is fixedly mounted on the first supporting frame 14, a control panel 11 and a light source drive plate 12 are mounted on the supporting plate 13, and the control panel 11 is electrically connected to the light source drive plate 12. The control panel 11 is configured to be operated by a human hand to control, by means of the light source drive plate 12, the first light source 15 to be turned on or turned off. Thus, the starry sky effect is controlled to be turned on or turned off. One end of the control panel 11 extends out of a surface of the transparent panel 4, and may be flush with or protrude from the surface of the transparent panel 4 such that the control panel 11 can be directly operated and controlled by the human hand.

In an alternative embodiment, a plurality of touch keys are arranged on the transparent panel 4, and the touch keys are electrically connected to the control panel 11 such that the human hand can directly touch the touch keys on the transparent panel 4 to operate the light source drive plate 12.

The second supporting frame 20 is further fixedly mounted on the inner bottom wall of the lamp frame 9, and the roller beam splitter 6 is located between the first supporting frame 14 and the second supporting frame 20. Two ends of the roller beam splitter 6 are movably connected to the first supporting frame 14 and the second supporting frame 20 respectively by means of bearings or other movable connectors such that the roller beam splitter 6 can rotate on the first supporting frame 14 and the second supporting frame 20. That is, the roller beam splitter 6 can rotate inside the lamp frame 9. The transmission shaft on the roller beam splitter 6 is in transmission connection to a driving device 17, and the driving device 17 is configured to drive the roller beam splitter 6 to rotate. The transmission shaft may be fixedly mounted at one end of the roller beam splitter 6 close to the second supporting frame 20, and the driving device 17 is fixedly mounted on the second supporting frame 20.

The starry sky mirror disc 2 and the starry sky laser assembly 18 are both mounted on the second supporting frame 20. The driving device 17 and the starry sky drive plate 10 are further mounted on the second supporting frame 20. The starry sky laser assembly 18 is electrically connected to the starry sky drive plate 10. The starry sky drive plate 10 is configured to control the starry sky laser assembly 18 to be turned on or turned off, such that a light source of the starry sky laser assembly 18 is turned on or turned off.

The starry sky laser assembly 18 includes the second light source 181, a lens cone 182 and color sheets 183, and the second light source 181, the lens cone 182 and the color sheets 183 are sequentially mounted on the second supporting frame in a direction away from the roller beam splitter 6. The second light source 181 is configured to generate light, and the light is emitted in a direction of the lens cone 182. The lens cone 182 is configured to split the light, such that non-coincident light is formed. All pieces of light are emitted to the color sheets 183 to be colored, such that light of different colors is formed. That is, the color sheets 183 are configured to color the light. The light of different colors passes through an optical imaging lens assembly 19 and then is emitted to the starry sky mirror disc 2, the optical imaging mirror assembly 19 is mounted between the starry sky mirror disc 2 and the starry sky laser assembly 18, and the starry sky mirror disc 2 reflects the light out through the first opening 3, such that light dots are formed. Different light forms light spots at different positions, such that stars in the natural night sky are simulated. The light reflected by the starry sky mirror disc 2 through the first opening 3 is directed to light reflected through the second opening 5. As shown in FIG. 3, the light is reflected by the starry sky mirror disc 2 in an upper-right direction, and the light is reflected out through the second opening 5 in a vertically-upward direction. The two pieces of light pass through a certain incident light path to be superposed to form an image in a certain area. However, the light dots and the strip-shaped light spots do not coincide but are superposed and combined together.

The first light source 15 is a red-green-blue-white (RGBW) four-in-one light source, and a light-emitting diode (LED) light source may be used. The second light source 181 is a laser.

The lens cone 182 is formed by splicing 10 strip-shaped lenses. One end of the lens cone 182 close to the second light source 181 is a narrow end, and the other end away from the second light source 181 is a wide end, such that the lens cone 182 is in a horn shape. The light emitted by the second light source 181 is subjected to actions of all lenses on the lens cone 182 to form 11 pieces of non-coincident light. The starry sky mirror disc 2 includes 140+ square small lenses, and all the square small lenses are spliced together spaced apart from each other. After the 11 pieces of light colored by the color sheets 183 are emitted to the 140+ square small lenses, the starry sky mirror disc 2 reflects 1540+(that is, 11*140+=1540+) light dots. These light dots form light-dot light spots to simulate a star effect of the natural night sky. Certainly, in actual use, the lens cone 182 may also be composed of other numbers of lenses. The starry sky mirror disc 2 may also be composed of other numbers of triangular or rhombic small lenses or small lenses in other shapes, and each small lens reflects light to form a light dot.

In the embodiment, the roller beam splitter 6 includes a hollow pentagonal prism, which is preferably a regular pentagonal prism, formed by sequentially splicing 5 flat strip-shaped lenses. That is, a surface of the lens is flat, the lens may be made of embossed tempered glass or other transparent glass, and the pentagonal prism formed by splicing 5 lenses has a pentagonal cross section. Due to a regular pentagon, an included angle formed by two adjacent lenses is 108 degrees. After the light is emitted to the roller beam splitter 6, images formed by the light are not superposed, the light is emitted through 3 lenses and then passes through the first opening 3 to form images, and the strip-shaped light spots are formed. The strip-shaped light spots formed are clear and sharp, and the light is evenly distributed. As the roller beam splitter 6 rotates clockwise or counterclockwise, clear and dynamic nonlinear strip-shaped light spots are presented to simulate an aurora effect of the natural night sky.

A waterproof cover 1 is mounted at each of two opposite ends of the lamp frame 9, and the waterproof covers 1 are configured to prevent water from entering the lamp frame 9 and play waterproof roles. Several stands 7 are mounted at the other end of the lamp frame 9 opposite one end on which the transparent panel 4 is mounted. For instance, one stand 7 is fixedly mounted on each of two sides of a lower end of the lamp frame 9 (the transparent panel 4 is mounted at an upper end of the lamp frame 9). The stands 7 may rotate relative to the lamp frame 9 to adjust directions and angles of the stands 7, and the stands 7 are configured to mount a lamp on an external carrier and other positions, such as an external wall or other carriers. A fixed plate 8 configured to carry a power supply is further fixedly mounted on the lamp frame 9, the power supply may be mounted on the fixed plate 8, and the power supply is electrically connected to the first light source 15, the starry sky drive plate 10, the control panel 11, the light source drive plate 12, the first light source 15, the driving device 17 and the starry sky laser assembly 18, so as to supply power to these components.

According to the present application, a starry sky is simulated by light-dot light spots formed by the light dots, an auroral cloud in the night sky is simulated by the strip-shaped light spots, and the light-dot light spots and the strip-shaped light spots are superposed together to form a combined effect, such that a starry sky effect of a galactic nebula is formed. Moreover, a dynamic effect is presented, an extremely beautiful effect is achieved, and a user experience degree is improved.

The embodiment disclosed in the description is only an instance of a single feature of the present application. The scope of protection of the present application is not limited to the embodiment. Any other embodiments having equivalent functions all fall within the scope of protection of the present application. Those skilled in the art can make various other corresponding changes and modifications according to the technical solutions and concepts described above. All of these changes and modifications should fall within the scope of protection of the claims of the present application.

The invention claimed is:

1. A lamp having a dynamic starry sky effect, comprising a lamp frame, and a first light source, an optical integrating lens, a roller beam splitter, a starry sky laser assembly and a starry sky mirror disc that are mounted in the lamp frame, wherein the optical integrating lens is mounted at a front part in a shining direction of the first light source, and the optical integrating lens is configured to focus light emitted by the first light source into strip-shaped light spots and transmit the strip-shaped light spots formed through focusing to the roller beam splitter located at the front part in the shining direction; the roller beam splitter is configured to form the light into nonlinear dynamic strip-shaped light spots during rotation;

the starry sky laser assembly comprises a second light source, the second light source is configured to generate light, the light generated by the second light source is emitted in a direction of the starry sky mirror disc, and the light is reflected by the starry sky mirror disc to form a plurality of light dots spaced apart from each other;

the light dots are reflected into the strip-shaped light spots, such that the light dots and the strip-shaped light spots are simultaneously observed by a human eye at a specific position; and the light dots and the strip-shaped light spots do not coincide but are superposed and combined together, such that the dynamic starry sky effect is formed by simulating stars with the light dots and simulating a nebula with the strip-shaped light spots.

2. The lamp having a dynamic starry sky effect according to claim 1, wherein the first light source is mounted on a bottom wall of the lamp frame, the optical integrating lens is mounted right above the first light source, and upward light emitted by the first light source is shined on the optical integrating lens; and the first light source comprises a plurality of light source units, each of the light source units corresponds to one optical integrating lens, and the plurality of light source units are arranged in a straight line in an axial direction of the lamp frame.

3. The lamp having a dynamic starry sky effect according to claim 1, wherein the first light source is located at one side inside the lamp frame, and the starry sky laser assembly is located at the other side inside the lamp frame, such that the first light source and the starry sky laser assembly are spaced apart from each other by a certain distance; after the strip-shaped light spots finally formed by the light emitted by the first light source and the light dots formed by the light emitted by the starry sky laser assembly pass a certain incident light path, a starry sky effect of a nebula formed by combining the light dots and the strip-shaped light spots is finally formed in a specific area; and the starry sky effect of the nebula is observed by a human eye in the area.

4. The lamp having a dynamic starry sky effect according to claim 1, wherein two ends of the roller beam splitter are rotatably connected to a first supporting frame and a second supporting frame respectively, such that the roller beam splitter rotates relative to the first supporting frame and the second supporting frame; and the first supporting frame and the second supporting frame are fixedly mounted spaced apart from each other on an inner bottom wall of the lamp frame.

5. The lamp having a dynamic starry sky effect according to claim 4, wherein a supporting plate is fixedly mounted on the first supporting frame, a control panel and a light source drive plate are mounted on the supporting plate, and the control panel is electrically connected to the light source drive plate; the control panel is configured to be operated by a human hand to control, by means of the light source drive plate, the first light source to be turned on or turned off; and one end of the control panel extends out of a surface of a transparent panel, such that the control panel is directly operated and controlled by the human hand.

6. The lamp having a dynamic starry sky effect according to claim 5, wherein the roller beam splitter is in transmission connection to a driving device by means of a transmission shaft on the roller beam splitter, the driving device is configured to drive the roller beam splitter to rotate, the transmission shaft is fixedly mounted at one end of the roller beam splitter close to the second supporting frame, and the driving device is fixedly mounted on the second supporting frame.

7. The lamp having a dynamic starry sky effect according to claim 6, wherein the starry sky mirror disc and the starry sky laser assembly are both mounted on the second supporting frame, a starry sky drive plate is further mounted on the second supporting frame, and the starry sky laser assembly is electrically connected to the starry sky drive plate; and the starry sky drive plate is configured to control the second light source in the starry sky laser assembly to be turned on or turned off, such that a light source of the starry sky laser assembly is turned on or turned off.

8. The lamp having a dynamic starry sky effect according to claim 7, wherein the transparent panel is mounted at one side end of the lamp frame, a first opening and a second opening that are spaced apart from each other are dug on the transparent panel, the roller beam splitter is located right below the second opening, and the starry sky mirror disc is located right below the first opening;

the starry sky laser assembly further comprises a lens cone and color sheets, the second light source, the lens cone and the color sheets are sequentially arranged on the second supporting frame in a direction away from the roller beam splitter, and the light generated by the second light source is emitted in a direction of the lens cone; the lens cone is configured to split the light, such that non-coincident light is formed; the color sheets are configured to color the light, such that light of different colors is formed; the light of different colors passes through an optical imaging lens assembly and then is emitted to the starry sky mirror disc, the optical imaging mirror assembly is mounted between the starry sky mirror disc and the starry sky laser assembly, and the starry sky mirror disc reflects the light out through the first opening, such that light dots are formed; different light forms light spots at different positions; and the light reflected by the starry sky mirror disc through the first opening is directed to light reflected through the second opening.

9. The lamp having a dynamic starry sky effect according to claim 8, wherein the lens cone comprises a plurality of strip-shaped lenses, and the plurality of strip-shaped lenses are spliced into the lens cone; one end of the lens cone close to the second light source is a narrow end, and one end away from the second light source is a wide end; the light emitted by the second light source is subjected to actions of all the lenses to form a plurality of pieces of non-coincident light;

the starry sky mirror disc comprises a plurality of small lenses, and all the small lenses are spliced spaced apart from each other to form the starry sky mirror disc; after a plurality of pieces of light colored by the color sheets are emitted to the small lenses, the starry sky mirror disc reflects a plurality of light dots; and the plurality of light dots form light-dot light spots to simulate stars.

10. The lamp having a dynamic starry sky effect according to claim 9, wherein the roller beam splitter comprises a hollow regular pentagonal prism formed by sequentially splicing 5 flat strip-shaped lenses.

* * * * *